(12) United States Patent
Li et al.

(10) Patent No.: US 10,805,012 B1
(45) Date of Patent: Oct. 13, 2020

(54) SYSTEMS AND METHODS FOR PROTECTING USERS

(71) Applicant: Symantec Corporation, Mountain View, CA (US)

(72) Inventors: Qing Li, Cupertino, CA (US); Brian Varner, Polk City, FL (US); Stanley Kiefer, Navarre, FL (US)

(73) Assignee: NortonLifeLock, Inc., Tempe, AZ (US)

( * ) Notice: Subject to any disclaimer, the term of this patent is extended or adjusted under 35 U.S.C. 154(b) by 0 days.

(21) Appl. No.: 16/698,798

(22) Filed: Nov. 27, 2019

(51) Int. Cl.
  *H04B 10/00* (2013.01)
  *H04B 10/85* (2013.01)
  *H04M 3/20* (2006.01)
  *H04W 4/029* (2018.01)
  *H04W 4/80* (2018.01)
  *G06K 9/00* (2006.01)
  *H04J 14/00* (2006.01)

(52) U.S. Cl.
  CPC ......... *H04B 10/85* (2013.01); *G06K 9/00671* (2013.01); *H04M 3/205* (2013.01); *H04W 4/029* (2018.02); *H04W 4/80* (2018.02)

(58) Field of Classification Search
  CPC ..................................................... H04B 10/85
  See application file for complete search history.

(56) References Cited

U.S. PATENT DOCUMENTS

| 2015/0241546 | A1* | 8/2015 | Boyle | G01S 3/28 382/103 |
| 2019/0369200 | A1* | 12/2019 | Finger | G06T 11/206 |

\* cited by examiner

*Primary Examiner* — Daniel G Dobson
(74) *Attorney, Agent, or Firm* — FisherBroyles, LLP

(57) ABSTRACT

The disclosed computer-implemented method for protecting users may include (i) detecting, by a sensor component, an electromagnetic signal radiating from an eavesdropping device, (ii) receiving, by a mobile computing device, information identifying the electromagnetic signal, and (iii) displaying, by the mobile computing device, an augmented reality display that overlays a visual indication of a location of the eavesdropping device on an image captured by a camera of the mobile computing device to enable a user to locate the eavesdropping device. Various other methods, systems, and computer-readable media are also disclosed.

20 Claims, 8 Drawing Sheets

SYSTEMS AND METHODS FOR PROTECTING USERS

BACKGROUND

Customers in the modern consumer marketplace face a variety of security threats relating to their homes and other areas. For example, pinhole cameras may serve as spyware devices, and these pinhole cameras are now a common problem in areas such as public restrooms, rented apartments, and even established hotel chains. Additionally, there are now many Wi-Fi access points, and sometimes these access points may be compromised or intentionally inserted and configured to perform man-in-the-middle interception attacks. In a final example, customers may sometimes be vulnerable to potential home intrusions, such as scenarios where an unauthorized person enters a hotel room while the legitimate customer is out of the room. Accordingly, there is a need and desire in the modern consumer marketplace for a product or solution that will help to address these types of risks and further optimize the security of users. The present disclosure, therefore, identifies and addresses a need for improved systems and methods for protecting users.

SUMMARY

As will be described in greater detail below, the present disclosure describes various systems and methods for protecting users. In one example, a computer-implemented method for protecting users may include (i) detecting, by a sensor component, an electromagnetic signal radiating from an eavesdropping device, (ii) receiving, by a mobile computing device, information identifying the electromagnetic signal, and (iii) displaying, by the mobile computing device, an augmented reality display that overlays a visual indication of a location of the eavesdropping device on an image captured by a camera of the mobile computing device to enable a user to locate the eavesdropping device.

In one embodiment, the sensor component may include an electromagnetic sensor component that expands electromagnetic sensing capabilities of the mobile computing device. In one embodiment, the sensor component communicates with the mobile computing device over shortwave radio. In one embodiment, the sensor component communicates with the mobile computing device over BLUETOOTH.

In one embodiment, the sensor component is physically affixed to an exterior of the mobile computing device using a clip. In one embodiment, the mobile computing device may include a smartphone or tablet. In one embodiment, the sensor component scans for eavesdropping devices over both optical wavelengths of light and radio frequencies. In one embodiment, the sensor component may include an optical sensor that detects light ranging from substantially 700 nanometers to 1 millimeter in wavelength. In one embodiment, the sensor component may include a radio sensor that scans through at least one of the following ranges: (i) substantially 902-928 megahertz range, (ii) substantially 2400-2500 megahertz range, and/or (iii) substantially 5725-5875 megahertz range. In one embodiment, the sensor component further performs a statistical analysis on the electromagnetic signal to distinguish between signals that indicate a security threat and those that do not.

In one embodiment, a system for implementing the above-described method may include (i) a detection module, stored in memory, that detects, as part of a sensor component, an electromagnetic signal radiating from an eavesdropping device, (ii) a reception module, stored in memory, that receives, as part of a mobile computing device, information identifying the electromagnetic signal and, (iii) a displaying module, stored in memory, that displays, as part of the mobile computing device, an augmented reality display that overlays a visual indication of a location of the eavesdropping device on an image captured by a camera of the mobile computing device to enable a user to locate the eavesdropping device, and (iv) at least one physical processor configured to execute the detection module, the reception module, and the displaying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, by a sensor component, an electromagnetic signal radiating from an eavesdropping device, (ii) receive, by a mobile computing device, information identifying the electromagnetic signal, and (iii) display, by the mobile computing device, an augmented reality display that overlays a visual indication of a location of the eavesdropping device on an image captured by a camera of the mobile computing device to enable a user to locate the eavesdropping device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
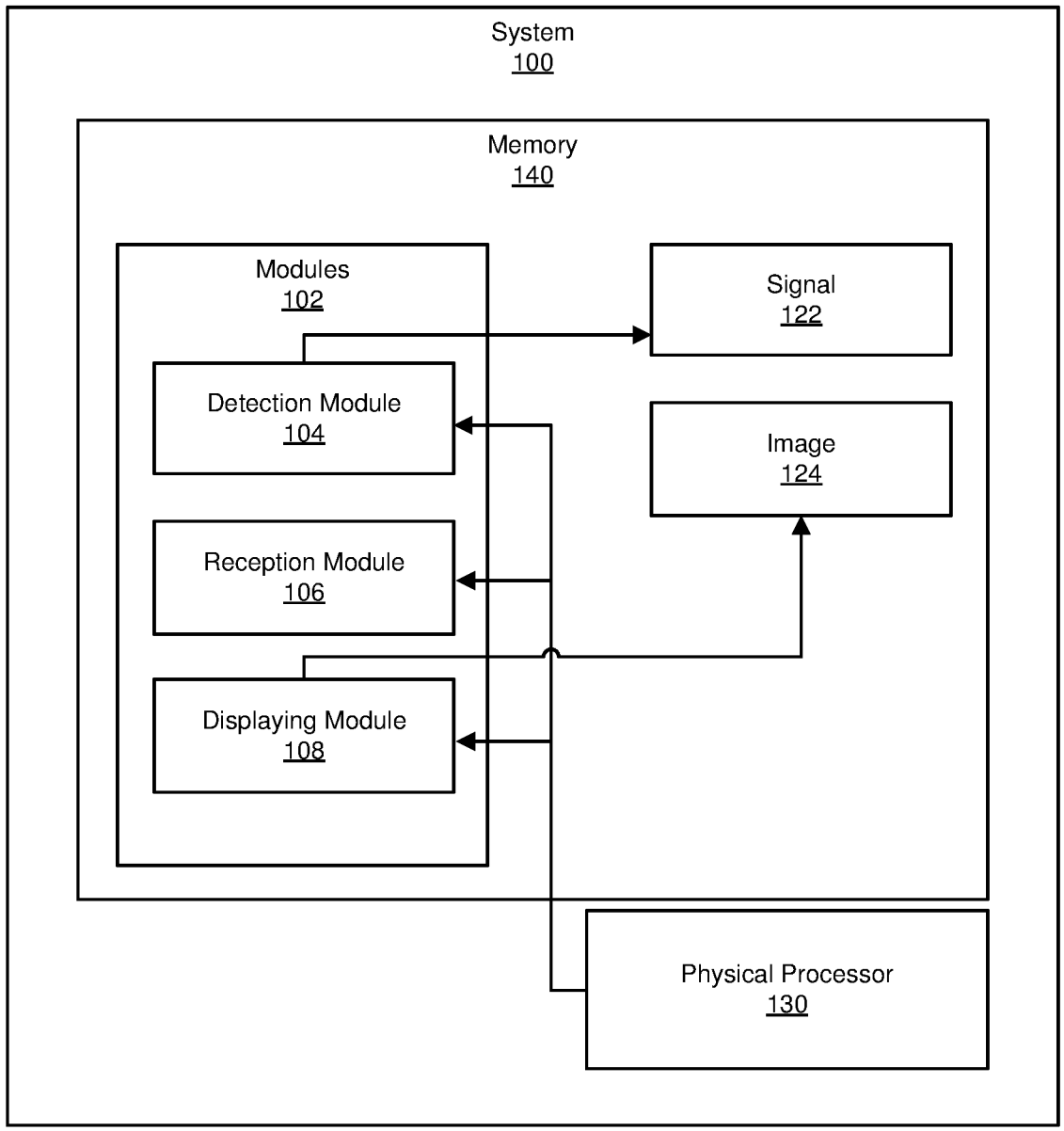
FIG. 1 is a block diagram of an example system for protecting users.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting users. The disclosed subject matter may improve the ability of users to detect potential security risks within their homes and other locations such as hotel rooms. In some examples, the disclosed subject matter may also optionally help notify users about the movements and locations of individuals that may potentially pose a security threat (e.g., a home intruder). The disclosed subject matter may include a consumer product that achieves one or more of these benefits by effectively expanding the heat and/or signal detection capabilities of a mobile device such as a smart phone or tablet. In other words, the disclosed subject matter may effectively transform a traditional smartphone device, for example, into a comprehensive anti-spy and anti-surveillance consumer product. In some examples, the disclosed subject matter may effectively track or identify candidate spy devices within a location by detecting heat or other signals emanating from these devices, including potentially other mobile devices. By tracking the location and movement of individuals based on the detection of signals from the mobile devices, the disclosed subject matter may notify homeowners and others about these movements, thereby potentially alerting these consumers to potential security risks or home intruders. Moreover, by leveraging some of the pre-existing functionality of the smart phone, the disclosed subject matter may also effectively mitigate costs and redundancies associated with reproducing those functionalities (e.g., the input, display, network, and/or camera capabilities) inside of a separate anti-spy consumer product, potentially saving the consumer money and increasing a corresponding convenience factor.

The disclosed subject matter may also optionally crowd source this information by coordinating or communicating with a backend security server, which may optionally be provided by a consumer security vendor such as NORTON LIFE-LOCK. In further examples, the disclosed subject matter may provide an augmented reality embodiment whereby the expanded signal detection capabilities of the new security product are combined in a new and inventive way with the camera and display capabilities of the mobile computing device such that a visual indication of the location of the potential spy device is displayed to the user within an image captured by the camera. These benefits of the disclosed subject matter are merely illustrative and other benefits may become apparent to the reader throughout the overview of FIG. 3, as discussed in more detail below.

Figure 2:
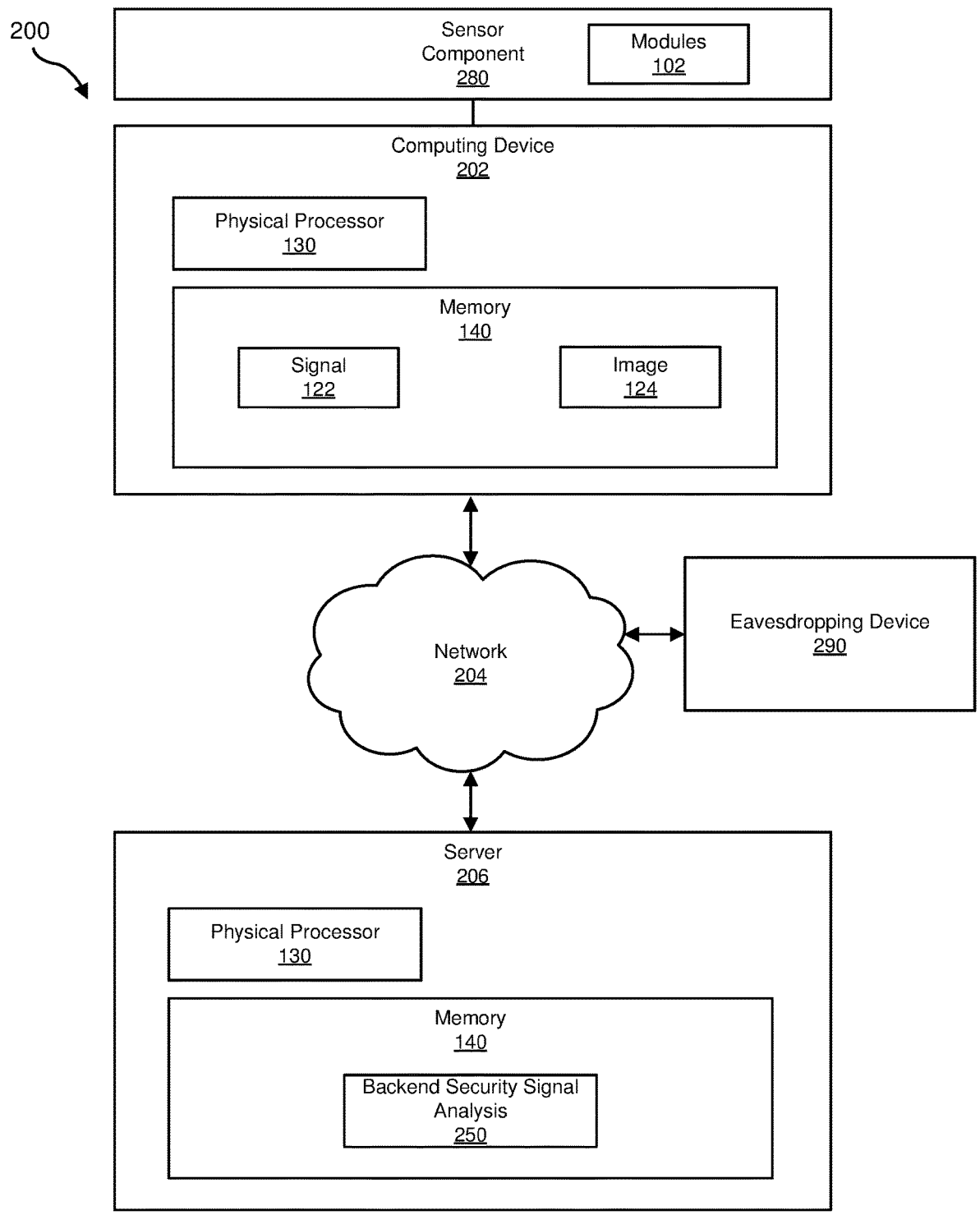
FIG. 2 is a block diagram of an additional example system for protecting users.

The following will provide, with reference to FIGS. 1-2, detailed descriptions of example systems for protecting users. Detailed descriptions of corresponding computer-implemented methods will also be provided in connection with FIGS. 3-7. In addition, detailed descriptions of an example computing system and network architecture capable of implementing one or more of the embodiments described herein will be provided in connection with FIGS. 7 and 8, respectively.

FIG. 1 is a block diagram of example system 100 for protecting users. As illustrated in this figure, example system 100 may include one or more modules 102 for performing one or more tasks. For example, and as will be explained in greater detail below, example system 100 may include a detection module 104 that detects, as part of a sensor component, an electromagnetic signal, such as a signal 122, radiating from an eavesdropping device, such as a pinhole camera. Example system 100 may additionally include a reception module 106 that receives, as part of the mobile computing device, information identifying signal 122. Example system 100 may also include a displaying module 108 that displays, as part of the mobile computing device, an augmented reality display that overlays a visual indication of a location of the eavesdropping device on an image 124 captured by a camera of the mobile computing device to enable a user to locate the eavesdropping device.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting users. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

In connection with FIG. 2, and as will be described in greater detail below, detection module 104 may detect, as part of a sensor component 280, signal 122 radiating from an eavesdropping device 290. Sensor component 280 may optionally be clipped or physically affixed to computing device 202, and may communicate with computing device 202 in a wired or wireless fashion, such as over a BLUETOOTH connection. In some examples, eavesdropping device 290 may be connected to a network 204, connected to a different network, or connected to no network at all. Reception module 106 may receive, as part of computing device 202, information identifying signal 122. Displaying module 108 may display, as part of computing device 202, an augmented reality display that overlays a visual indication of a location of eavesdropping device 290 on image 124 captured by a camera of computing device 202 to enable a user to locate eavesdropping device 290.

Computing device 202 generally represents any type or form of computing device capable of reading computer-executable instructions and designed for mobility. Additional examples of computing device 202 include mobile computing devices, such as laptops, smartphones, tablets, cellular phones, Personal Digital Assistants (PDAs), multimedia players, embedded systems, wearable devices (e.g., smart watches, smart glasses, etc.), variations or combinations of one or more of the same, and/or any other suitable computing device.

Server 206 generally represents any type or form of computing device that is capable of facilitating the performance of method 300, as discussed in more detail below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
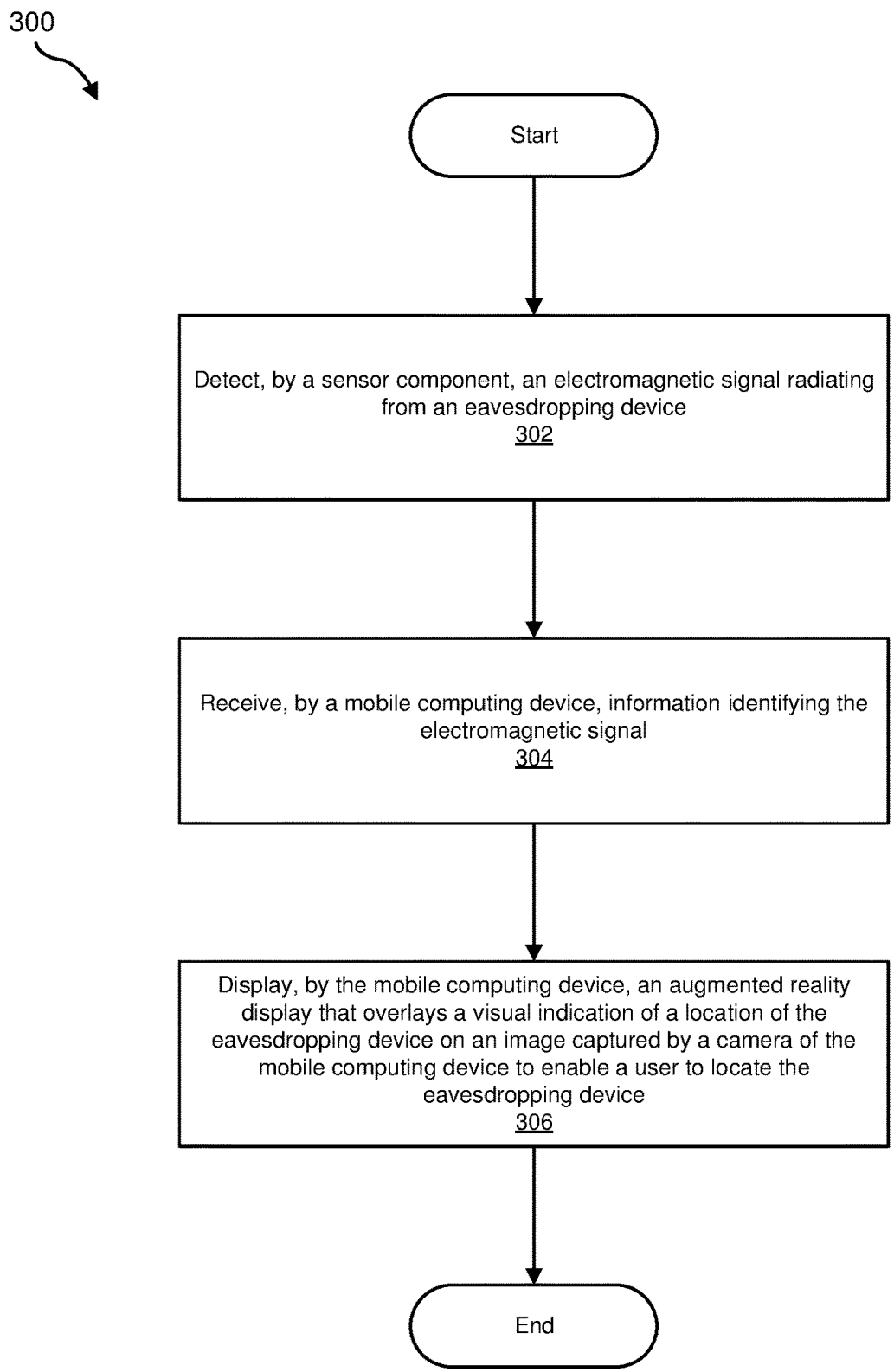
FIG. 3 is a flow diagram of an example method for protecting users.

FIG. 3 is a flow diagram of an example computer-implemented method 300 for protecting users. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, as part of a sensor component, an electromagnetic signal radiating from an eavesdropping device. For example, detection module 104 may detect, as part of sensor component 280, signal 122 radiating from eavesdropping device 290.

As used herein, the term "sensor component" generally refers to any physical signal detection device that may expand the signal detection capabilities of another distinct mobile device, such as computing device 202. Generally speaking, the sensor component may correspond to a separate security-based consumer product that the customer may purchase and which may interface with a computing device, such as smart phone, that the user already possesses. The sensor component may optionally connect to the computing device physically, such as by using a clip or other physical connector, and the sensor component may also communicate with the computing device using a wired or wireless connection as discussed further below. Although traditional smartphones may include wireless communication features, these features may be limited in functionality to serving the purposes of wireless network communications, as distinct from detection of spying or eavesdropping components or tracking the movement of individuals. Accordingly, expanding the types and ranges of signals detected using a security-based add-on component, such as sensor component 280, may thereby enhance the functionalities of the user's pre-existing mobile computing device and also further enhance the user's security.

In contrast, the term "eavesdropping device" generally refers to any device configured to record information about its environment, including especially devices that are maliciously placed to do so surreptitiously. The recorded information may include image, video, microphone, and/or network communication information or packets. Illustrative examples of eavesdropping devices may include pinhole cameras and/or compromised wireless access points, which may be configured to perform man-in-the-middle interception attacks. Of course, in some scenarios, general purpose mobile computing devices may perform eavesdropping functionality, such as by a user surreptitiously toggling a microphone or camera. Generally speaking, all of these devices may communicate wirelessly, in addition to merely recording data, and therefore these devices may also emanate electromagnetic or other signals that may be detected, thereby enabling potential victims to discover the corresponding surveillance or eavesdropping and protect themselves from it. Of course, in other examples, one or more of these devices may not communicate wirelessly at all, and instead may merely record data in order for a malicious attacker to pick up the device later. Even in that case, the onboard circuitry of the eavesdropping device may produce one or more signals that may be detected using the expanded signal detection functionalities of sensor component 280. Although spying devices, including maliciously configured mobile devices, may generally communicate through electromagnetic signals, the overall inventive concept here is not necessarily limited to electromagnetic signals and other signals may be used as appropriate, including for example audio signals.

As further discussed above, the sensor component may optionally communicate with a mobile computing device over a wired or wireless connection. In further examples, the wireless connection may include a shortwave radio connection. In even further specific examples, the wireless connection may include a BLUETOOTH connection.

In additional examples, the sensor component may be physically affixed to an exterior of the mobile computing device. Attaching the sensor component to the mobile computing device may be performed using a clip or another suitable connector. Of course, the sensor component generally may communicate wirelessly with a mobile computing device and, therefore, need not always be physically attached to the mobile computing device. Nevertheless, physically attaching the sensor component to the mobile computing device may increase a convenience factor when the user engages in the augmented reality embodiment, as discussed in further detail below.

Figure 4:
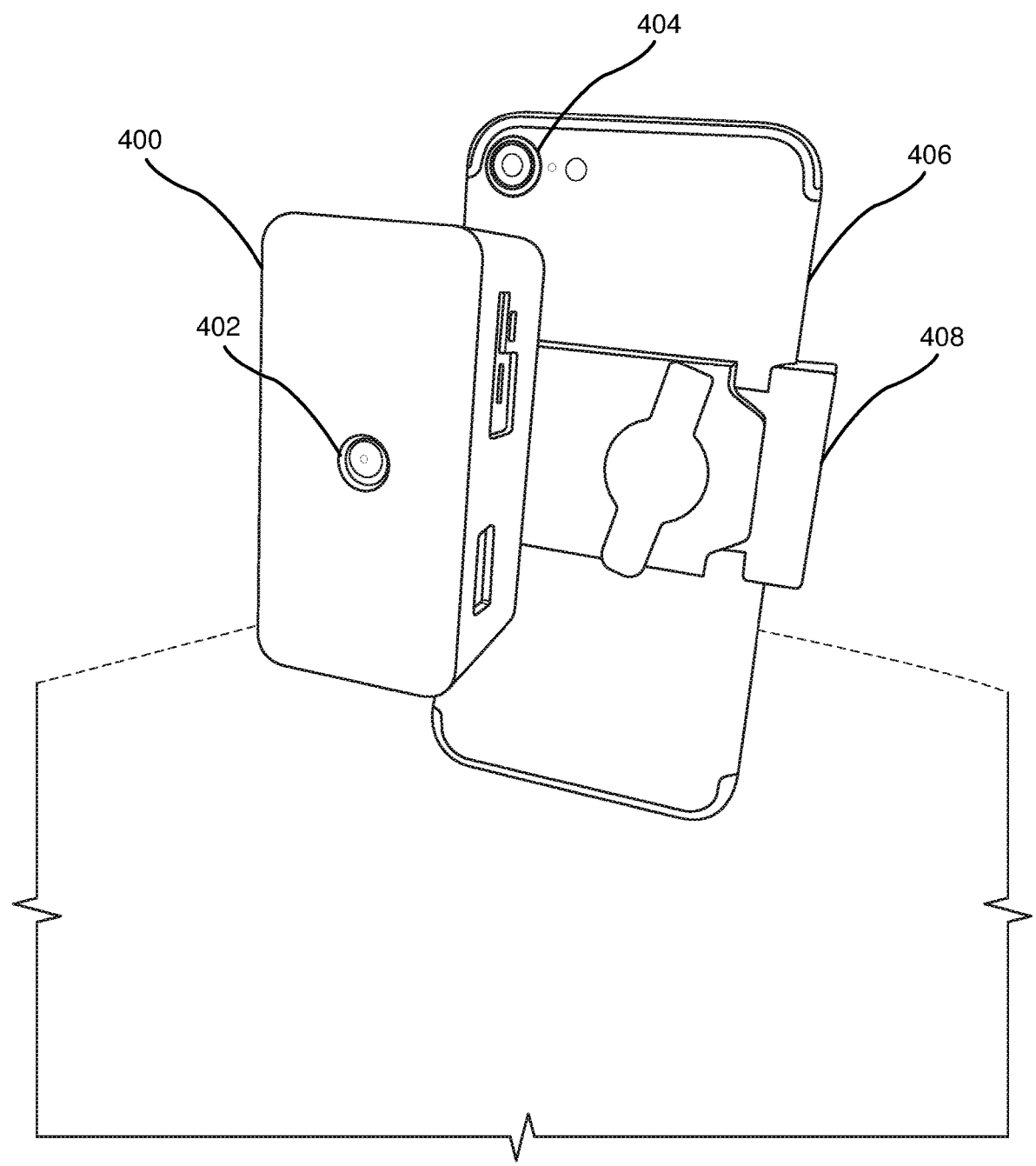
FIG. 4 is an illustration of an example computing system for protecting users.

FIG. 4 shows an illustrative example of computing device 202 in the form of smart phone 406. This figure further shows that smart phone 406 may include a camera lens 404 and may be attached to a sensor component 400 using a clip 408. The figure also illustrates how sensor component 400 may include a sensor lens 402.

Figure 5:
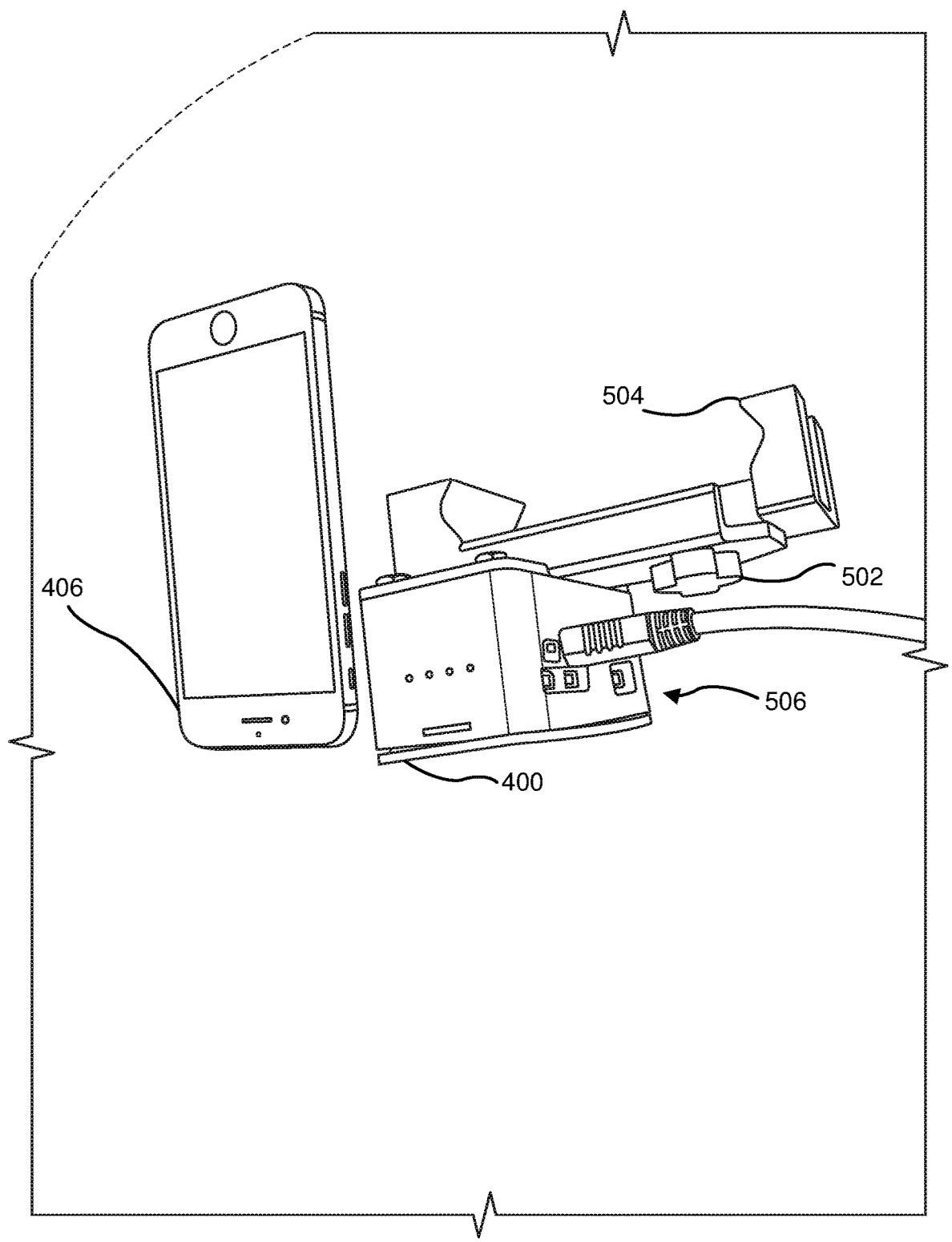
FIG. 5 is another illustration of the example computing system for protecting users.

Similarly, FIG. 5 shows another illustrative example of smart phone 406. In this example, smart phone 406 has been detached from clip 408. Removing smart phone 406 from clip 408 and the corresponding connection to sensor component 400 further highlights how clip 408 may optionally operate in one embodiment. More specifically, a rotatable screw or twist component 502 may enable a user to adjust the distance between a grip portion 504 and an opposite portion or extremity of clip 408. The user may thereby manually tighten grip portion 504 onto the sides of smart phone 406 to achieve the affixing or physical connection. Of course, this example is merely illustrative and any other suitable physical affixing technique may be used, as further described above. FIG. 5 illustrates how sensor component 400 may optionally include an input/output panel of connectors or sockets for wired connections (e.g., wired communications for data and/or power), memory cards, etc.

In one embodiment, the sensor component scans for eavesdropping devices over both optical wavelengths of light and radio frequencies. The combination of detection and/or analysis over both optical wavelengths of light and radio frequencies dramatically expands the capabilities of a traditional smart phone. In one embodiment, the sensor component may include an optical sensor that detects light ranging from substantially 700 nanometers to 1 millimeter in wavelength. Additionally, or alternatively, the sensor component may include a radio sensor that scans through at least one of the following ranges: (i) substantially 902-928 megahertz range, (ii) substantially 2400-2500 megahertz range, and/or (iii) substantially 5725-5875 megahertz range.

In one embodiment, the sensor component further performs a statistical analysis on the electromagnetic signal to help distinguish between signals that indicate a security threat and those that do not. In other words, not all signals detected by the sensor component may be malicious or pose a security threat. Instead, some signals might be emanating from relatively safe household appliances or Internet-of-Things devices, for example. In view of this distinction, the sensor component may perform one or more instances of signal analysis on the detected signal, such as by comparing one or more attributes or patterns associated with the signal with attributes or patterns that are known to be associated with previously detected malicious signals. For example, a compromised wireless access point might generate a signal with a partially identifying pattern, frequency, and/or timing, which thereby helps identify that the wireless access point is compromised. In performing this additional signal analysis, the sensor component may also optionally interface with, or coordinate with, both the mobile computing device and/or server 206, which may include a backend security signal analysis 250, such as that provided by NORTON LIFE-LOCK, as discussed above. For example, server 206 may maintain a database of information regarding previously detected signals that are confirmed to be malicious, or potentially malicious, as well as the corresponding identifying attributes for these signals.

At step 304, one or more of the systems described herein may receive from the sensor component, as part of a mobile computing device, information identifying the electromagnetic signal. For example, reception module 106 may, as part of computing device 202, receive from sensor component 280 information identifying the signal 122.

Reception module 106 may receive the information identifying the electromagnetic signal in a variety of ways. As further discussed above, reception module 106 may be included within the network communication components of computing device 202. For example, reception module 106 may be included within a BLUETOOTH communication component of computing device 202. Of course, other near and local wireless network communication technologies may be used, as well as wired connections.

In some examples, reception module 106 may receive the information identifying the electromagnetic signal by receiving a portion or an entirety of the signal itself. Additionally, or alternatively, reception module 106 may receive information that describes the electromagnetic signal, even if the information is not included within the signal. For example, reception module 106 may receive a hash or fingerprint of the signal. Similarly, reception module 106 may also receive header information or metadata describing attributes or patterns associated with the signal, including a timing of the signal, a geolocation where the signal was detected, etc.

As further discussed above, in some examples, any one or more of the above items of information may be shared between sensor component 280, computing device 202, and server 206. Server 206 may optionally generate a large database of information received from a large number of different sensor components that were purchased by different and distinct customers across a wide area. Building the database may enable users to share information indicating security risks and to leverage the insights and discoveries that other users have already made.

At step 306, one or more of the systems described herein may display, as part of the mobile computing device, an augmented reality display that overlays a visual indication of a location of the eavesdropping device on an image captured by a camera of the mobile computing device to enable a user to locate the eavesdropping device. For example, displaying module 108 may, as part of computing device 202, display an augmented reality display that overlays a visual indication of a location of eavesdropping device 290 on image 124 captured by a camera of computing device 202 to enable a user to locate eavesdropping device 290.

Displaying module 108 may display image 124 in a variety of ways. Generally speaking, displaying module 108 may display image 124 at least in part by aggregating location and other information detected by sensor component 280 with visual information captured by a camera of computing device 202. For example, displaying module 108 may perform intelligent mapping between two-dimensional or three-dimensional location information detected by sensor component 280 to corresponding locations shown within an image captured by a camera of the mobile computing device. After performing this translation or mapping, displaying module 108 may thereby overlay one or more visual indicators of a corresponding location onto an image captured by the camera of the mobile computing device. Of course, the image may correspond to a static image or an image captured within a video. Similarly, as the user moves the smart phone and thereby moves the angle or position of the camera, displaying module 108 may also optionally update the augmented reality display in real-time to adjust where the visual indicator is in correspondence to the movement.

Generally speaking, displaying module 108 may display an indicator for any one or more locations where sensor component 280 detected a candidate security threat or other signal. Of course, displaying module 108 may also optionally select to display, or to omit the display, of one or more visual indicators for detected signals based at least in part on an analysis of whether the signals match any known attributes or patterns associated with previously detected and known malicious signals, as further discussed above. Additionally, displaying module 108 may also optionally calculate one or more security or privacy scores for the environment around sensor component 280 and/or any larger surrounding locations (e.g., corporate headquarters) or smaller sublocations within the same environment (e.g., different rooms in the same apartment).

Figure 6:
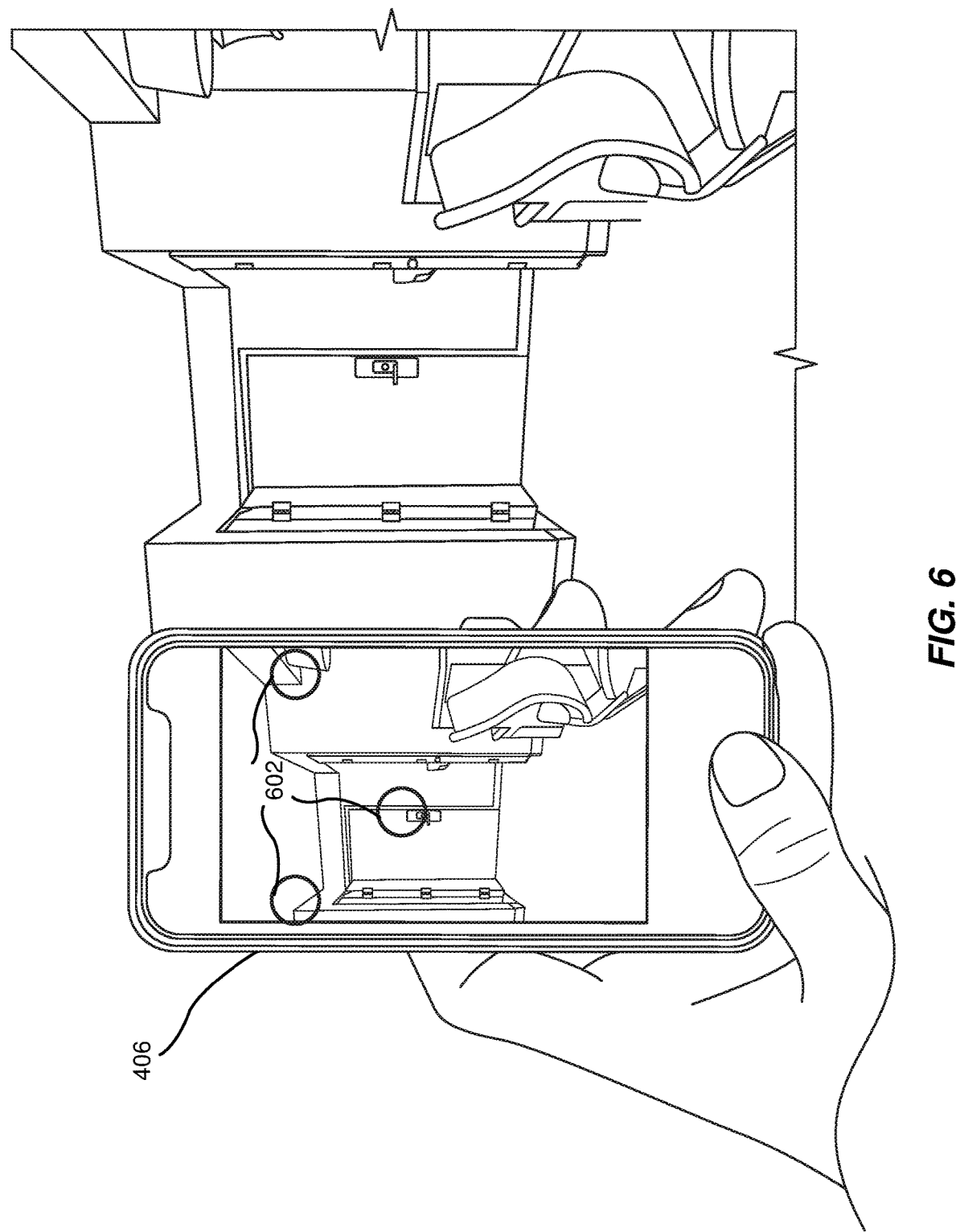
FIG. 6 is another illustration of the example computing system for protecting users.

FIG. 6 shows an illustrative example of how sensor component 280 may enable the augmented reality environment that was further discussed above. In this example, the user is holding smart phone 406 in his hand. Based on wireless communications with sensor component 280, smart phone 406 may enable an augmented reality display on its screen, and this display may include three separate circular visual indicators 602. Each of these visual indicator 602 may identify a location or spot where sensor component 280 detected a signal, such as an electromagnetic signal, and further optionally determine that the signal indicates a candidate security threat. In the example of this figure, these three visual indicator 602 may pick out spots within a hotel room where three different spying devices have been implanted or installed. Of course, as discussed above, one or more of these devices may prove to be benign or innocuous. Nevertheless, the visual indicators may enable the user to inspect the spots and corresponding devices to perform a manual verification and thereby help the user to secure his surroundings and prevent the compromising of his or her privacy.

The above discussion provides a general overview of the disclosed subject matter in connection with FIG. 3. Additionally, the following discussion provides a supplementary overview of concrete and detailed embodiments of the disclosed subject matter.

The subject matter of this application may help to solve or address many of the problems outlined in the background section. In particular, the disclosed subject matter may improve upon related systems using one or more of the following inventive features: (i) the disclosed subject matter may detect hidden recording devices with the assistance of an augmented reality application, (ii) the disclosed subject matter may include passive collection of optical and radio wavelengths to provide positive attribution of a physical device, (iii) the disclosed subject matter may optionally crowd source information regarding the movements of persons and their corresponding devices, especially when those movements may indicate potential security threats, and/or (iv) the disclosed subject matter may include passive tracking of individuals based off of the signals that emanate from devices on their person, such as BLUETOOTH or Wi-Fi signals.

The disclosed subject matter may take the form of a physical consumer security product, which may form an add-on component or other component connectable to a mobile computing device such as a smart phone or tablet. The security product may be designed as a personal security apparatus, which may be used to analyze and detect the current threat to an individual as the individual explores different locations. The security product may be self-contained and fully autonomous in terms of information collection. In one embodiment, the battery life may operate for approximately eight hours depending on the corresponding load factor.

One primary focus of the security product is to detect eavesdropping devices such as hidden cameras. The security product may achieve this by surveying various light waves with an onboard camera and radio waves that utilize 802.11 b/g/n signals. The security device optionally provides augmented reality when the device is clipped to a phone. This helps the user to attempt to not only detect an eavesdropping device but to locate it as well. If the mobile device has a camera with any level of depth perception, such as the APPLE TRUEDEPTH camera system, then the security device can optionally use it to determine heat signatures. Of course, in some scenarios the security device may have its own comparable camera. This technology leverages the insight that devices that transmit and process images radiate heat. Additionally, in some scenarios it may be possible to detect heat behind walls and/or embedded in furniture.

All the information that the security device collects is optionally transmitted to an application on the phone. The transmission may optionally be made through BLUETOOTH. The information may be encrypted on the security device first before being transmitted for security purposes. Once the information is received by the application on the phone, the information may be processed, geotagged, and/or uploaded to a central repository for further enrichment.

The security device may correspond to a signals acquisition platform. This platform may be novel and unique due to the fact that it fuses information regarding detected optical wavelengths of light with radiofrequency signals to provide detection, identification, and attribution of various eavesdropping devices through augmented reality. By using augmented reality, the end user can determine the source of the emissions of the eavesdropping device. The security device may have an optical sensor that performs constant analysis on collected light waves ranging from 700 nm to 1 mm with a corresponding frequency of 430 terahertz to 300 GHz looking for signatures of cameras and other eavesdropping devices. In parallel, the security device software may define radio captures in the ranges of 902-928, 2400-2500, and/or 5725-5875 MHz while looking for signatures of both audio and video eavesdropping devices.

When the security device identifies a signature from either of the two collection sensors it may perform preliminary identification and analysis locally in a smartphone application. The information may also be optionally set up to a security vendor backend server for more in-depth analysis. The backend server may optionally push back the results of this additional analysis in real time. The security device has proven to find devices in a room in a matter of seconds. Once a positive attribution is made, the security device may optionally upload the geographic coordinates, timestamp, and/or other identifying metadata characteristics of the discovery device, such as the make and model or ownership. Once two or more of the items identified above have been aggregated and fused, the security device may also begin assigning different physical areas with a corresponding privacy score. The privacy score can also be pushed to other users of different instances of the security device, thereby warning them of potential technical threats that they may face when encountering a specific area (e.g., based on information detected when a different instance of the device for different customer was previously in the same location and previously detected a parallel security threat).

Figure 7:
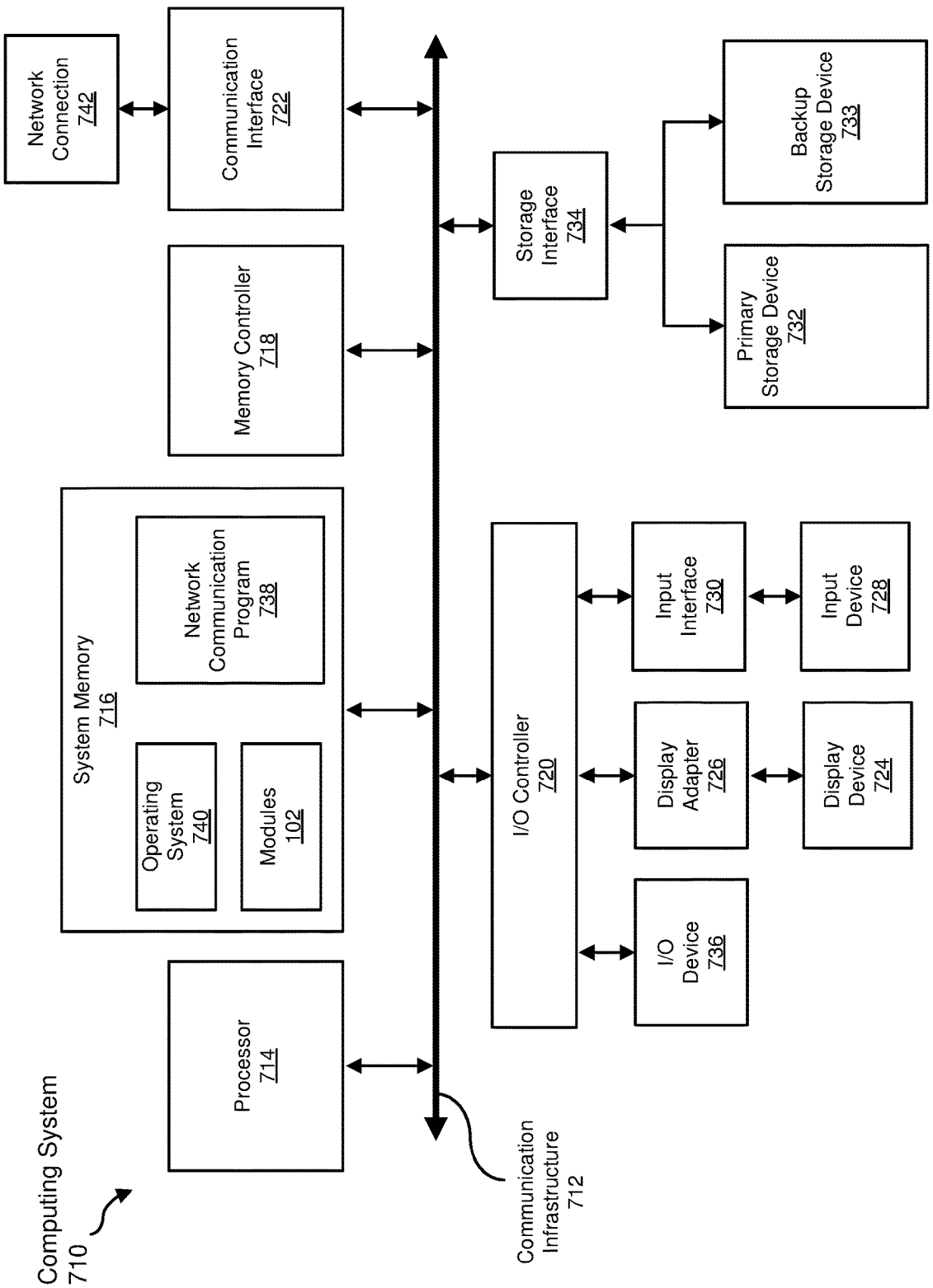
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
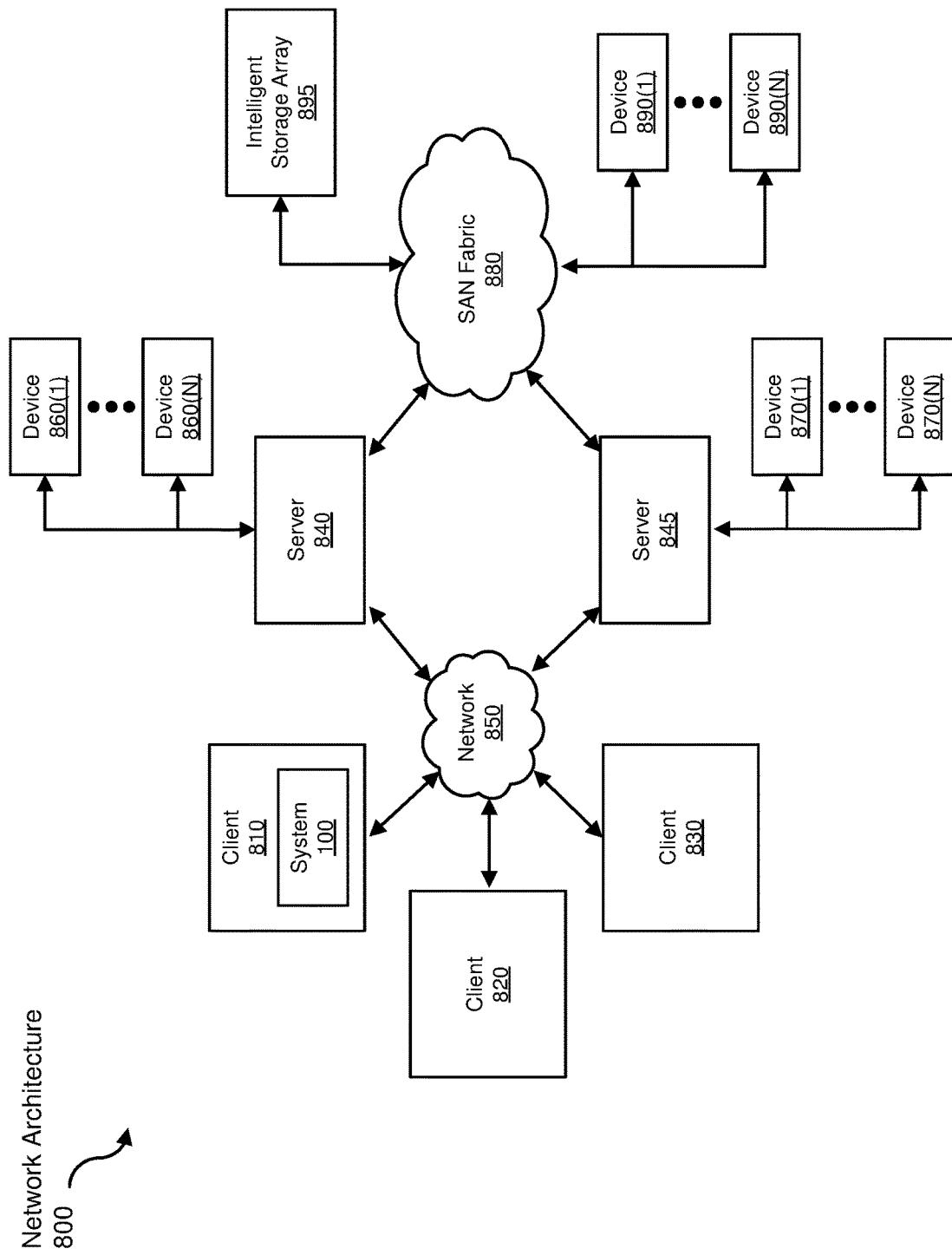
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for protecting users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting users, at least a portion of the method being performed by a computing device comprising at least one processor, the method comprising:
   detecting, by a sensor component, an electromagnetic signal radiating from an eavesdropping device;
   receiving, by a mobile computing device, information identifying the electromagnetic signal; and
   displaying, by the mobile computing device, an augmented reality display that overlays a visual indication of a location of the eavesdropping device on an image captured by a camera of the mobile computing device to enable a user to locate the eavesdropping device.

2. The computer-implemented method of claim 1, wherein the sensor component comprises an electromagnetic sensor component that expands electromagnetic sensing capabilities of the mobile computing device.

3. The computer-implemented method of claim 2, wherein the sensor component communicates with the mobile computing device over shortwave radio.

4. The computer-implemented method of claim 3, wherein the sensor component communicates with the mobile computing device over BLUETOOTH.

5. The computer-implemented method of claim 1, wherein the sensor component is physically affixed to an exterior of the mobile computing device using a clip.

6. The computer-implemented method of claim 1, wherein the mobile computing device comprises a smartphone or tablet.

7. The computer-implemented method of claim 1, wherein the sensor component scans for eavesdropping devices over both optical wavelengths of light and radio frequencies.

8. The computer-implemented method of claim 7, wherein the sensor component comprises an optical sensor that detects light ranging from substantially 700 nanometers to 1 millimeter in wavelength.

9. The computer-implemented method of claim 7, wherein the sensor component comprises a radio sensor that scans through at least one of the following ranges:
   substantially 902-928 megahertz range;
   substantially 2400-2500 megahertz range; or
   substantially 5725-5875 megahertz range.

10. The computer-implemented method of claim 1, wherein the sensor component further performs a statistical analysis on the electromagnetic signal to distinguish between signals that indicate a security threat and those that do not.

11. A system for protecting users, the system comprising:
   a detection module, stored in memory, that detects, as part of a sensor component, an electromagnetic signal radiating from an eavesdropping device;

a reception module, stored in memory, that receives, as part of a mobile computing device, information identifying the electromagnetic signal;

a displaying module, stored in memory, that displays, as part of the mobile computing device, an augmented reality display that overlays a visual indication of a location of the eavesdropping device on an image captured by a camera of the mobile computing device to enable a user to locate the eavesdropping device; and at least one physical processor configured to execute the detection module, the reception module, and the displaying module.

12. The system of claim 11, wherein the sensor component comprises an electromagnetic sensor component that expands electromagnetic sensing capabilities of the mobile computing device.

13. The system of claim 12, wherein the sensor component communicates with the mobile computing device over shortwave radio.

14. The system of claim 13, wherein the sensor component communicates with the mobile computing device over BLUETOOTH.

15. The system of claim 11, wherein the sensor component is physically affixed to an exterior of the mobile computing device using a clip.

16. The system of claim 11, wherein the mobile computing device comprises a smartphone or tablet.

17. The system of claim 11, wherein the sensor component scans for eavesdropping devices over both optical wavelengths of light and radio frequencies.

18. The system of claim 17, wherein the sensor component comprises an optical sensor that detects light ranging from substantially 700 nanometers to 1 millimeter in wavelength.

19. The system of claim 17, wherein the sensor component comprises a radio sensor that scans through at least one of the following ranges:
substantially 902-928 megahertz range;
substantially 2400-2500 megahertz range; or
substantially 5725-5875 megahertz range.

20. A non-transitory computer-readable medium comprising one or more computer-readable instructions that, when executed by at least one processor of a computing device, cause the computing device to:

detect, by a sensor component, an electromagnetic signal radiating from an eavesdropping device;

receive, by a mobile computing device, information identifying the electromagnetic signal; and display, by the mobile computing device, an augmented reality display that overlays a visual indication of a location of the eavesdropping device on an image captured by a camera of the mobile computing device to enable a user to locate the eavesdropping device.

* * * * *